US010578489B2

(12) United States Patent
Miles et al.

(10) Patent No.: US 10,578,489 B2
(45) Date of Patent: Mar. 3, 2020

(54) SLOW LIGHT IMAGING SPECTROSCOPY

(71) Applicant: The Trustees of Princeton University, Princeton, NJ (US)

(72) Inventors: Richard Miles, Princeton, NJ (US); Arthur Dogariu, Hamilton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 0 days.

(21) Appl. No.: 16/244,619

(22) Filed: Jan. 10, 2019

(65) Prior Publication Data

US 2019/0212196 A1 Jul. 11, 2019

Related U.S. Application Data

(60) Provisional application No. 62/615,470, filed on Jan. 10, 2018.

(51) Int. Cl.
*G01J 3/44* (2006.01)
*G01J 3/10* (2006.01)
*G01J 3/28* (2006.01)

(52) U.S. Cl.
CPC ............... *G01J 3/4412* (2013.01); *G01J 3/10* (2013.01); *G01J 3/2823* (2013.01)

(58) Field of Classification Search
CPC .......... G01J 3/4412; G01J 3/10; G01J 3/2823; G01J 3/0205
USPC ......................................................... 356/301
See application file for complete search history.

(56) References Cited

U.S. PATENT DOCUMENTS

| | | | | |
|---|---|---|---|---|
| 6,276,798 B1* | 8/2001 | Gil | ....................... | A61B 5/0059 |
| | | | | 351/206 |
| 6,307,626 B1* | 10/2001 | Miles | ....................... | G01J 3/44 |
| | | | | 356/301 |
| 8,005,332 B2* | 8/2011 | Schmidt | ............. | G01N 21/3103 |
| | | | | 356/432 |
| 2009/0073450 A1* | 3/2009 | Boyd | ....................... | G01B 9/02 |
| | | | | 356/454 |
| 2014/0313510 A1* | 10/2014 | Schmidt | ............. | G01N 15/1436 |
| | | | | 356/338 |

OTHER PUBLICATIONS

Narrow-linewidth passband filter for ultraviolet rotational Raman imaging, Finkelstein et al, Apr. 15, 1997 / vol. 22, No. 8 / Optics Letters (Year: 1997).*

(Continued)

*Primary Examiner* — Tarifur R Chowdhury
*Assistant Examiner* — Jonathon Cook
(74) *Attorney, Agent, or Firm* — Meagher Emanuel Laks Goldberg & Liao, LLP

(57) ABSTRACT

Disclosed is a process and device that enables ultra-high resolution one- and two-dimensional spatial imaging of Rayleigh, Raman and Thomson spectral features without the need for a spectrometer. The disclosed approach provides the capability for imaging of a single spectral feature such as a single rotational Raman line and the simultaneous elimination of background scattering, or for separating the rotational Raman image from the Rayleigh scattering. High collection efficiency provides the opportunity for single pulse time frozen images to be acquired.

16 Claims, 6 Drawing Sheets

(56) References Cited

OTHER PUBLICATIONS

A. Dogariu; R. B. Miles: "Slow Light Imaging Spectroscopy with a Passive Atomic Filter", Conference on Lasers and Electro-Optics, OSA Technical Digest (online) (Optical Society of America, 2018), paper STu4P.1.

L. V. Hau, S. E. Harris, Z. Dutton, and C. H. Behroozi: "Light speed reduction to 17 metres per second in an ultracold atomic gas", Nature vol. 397, pp. 594-598 (1999).

L. J. Wang, A. Kuzmich, and A. Dogariu: "Gain-assisted superluminal light propagation", Nature vol. 406, pp. 277-279 (2000).

* cited by examiner

SLOW LIGHT IMAGING SPECTROSCOPY

CROSS REFERENCE TO RELATED APPLICATIONS

This application claims priority to U.S. Provisional Application No. 62/615,470 filed Jan. 10, 2018, which is hereby incorporated in its entirety by reference.

STATEMENT REGARDING FEDERALLY SPONSORED RESEARCH OR DEVELOPMENT

This invention was made with government support under No. FA9550-17-1-0156 awarded by the Air Force Office of Scientific Research. The government has certain rights in the invention.

BACKGROUND

Raman, Rayleigh and Thomson scattering play roles in various detection techniques. One of the advantages of these types of scattering is that the signals are produced only during the illumination time, so no quenching effects are present and time gating of the scattered light provides a method for discrimination.

However, the challenge for hyperspectral imaging is that all the Raman, Rayleigh and Thomson scattering is generated at the same time, so distinguishing the various spectral components generally requires a spectrometer. This is particularly difficult for rotational Raman scattering, for which the spectra from all the Raman active species are intermingled, and where the pump laser Rayleigh scattering dominates at low frequency shifts. Furthermore, the use of a spectrometer limits the imaging capability to one dimension and significantly reduces the light collection efficiency (etendue) due to the spectrometer f number (acceptance angle), diffraction grating losses and slit width requirements.

A method and system for highly selective imaging of Rayleigh, Raman and Thomson scattering features associated with gases, plasmas, liquids and solids is therefore useful and desirable.

BRIEF SUMMARY

The present invention is draft to a system and method for slow light imaging spectroscopy.

Disclosed is a system for slow light imaging spectroscopy that uses an atomic vapor cell with an aperture large enough to achieve imaging of the light passing through, the selection of an atomic vapor with the proper characteristics to provide sufficient reduction in the propagation speed to separate the light of interest from out of band background light, and the selection of a frequency tunable laser that has the wavelength, tuning range, pulse duration and pulse energy appropriate to the spectroscopy that is to be undertaken to analyze a plasma, gas, solid or liquid sample. The atomic vapor should include at least one isotope having a hyperfine split ground state or two isotopes with closely separated ground states. A time-gated detector, such as a time-gated camera, may be used to detect and/or record delayed images. In some embodiments, the laser may be provided by a Ti:Sapphire laser, an Alexandrite laser, a nanosecond Nd:YAG laser pumping a dye laser, an optical parametric oscillator, or a combination thereof. In certain embodiments, the at least one atomic vapor includes one or more isotopes of elements selected from the group consisting of rubidium, cesium, and mercury, and the vapor pressure in the cell and cell length selected so as to optimize the trade off between the time delay and absorption losses for a given application. In some embodiments, a processor may be configured to receive and store time-delayed images in a data storage location.

A method for slow light imaging spectroscopy is also disclosed. The method begins by generating a beam of light with a laser having a desired wavelength and passing the beam of light through a plasma, gas, solid or liquid sample, where at least a portion of the beam of light is scattered by the sample. The method continues by reducing group velocity of at least some of the scattered light by passing at least some scattered light through an atomic vapor in an atomic vapor cell, where the atomic vapor should include at least one isotope having a hyperfine split ground state or two isotopes with closely separated ground states. After passing through the atomic vapor cell, the scattered light is received, and a delayed image may be recorded. In some embodiments, the scattered light is received by a time gated detector, such as a time gated camera. In some embodiments, the atomic vapor includes one or more isotopes of elements selected from the group consisting of rubidium, cesium, and mercury, which may or may not be heated. In some embodiments, the method may also include varying the frequency of the beam of light and determining group delay at a plurality of frequencies.

DETAILED DESCRIPTION

Disclosed is a method and system for slow light imaging spectroscopy (SLIS), which allows inter alia, for highly selective imaging of Rayleigh, Raman and Thomson scattering features associates with gases, plasmas, liquids and solids. It allows for imaging the molecular spectroscopic features by delaying the light with frequencies situated in the spectral region where an atomic gas filter cell provides a strong index of refraction gradient. Specifically, the strong positive dispersion provided by the hyperfine split ground state, or two isotopes with closely separated ground states imposes a greatly reduced group velocity, leading to what is known as slow light. Conversely, strong negative dispersion leads to so-called fast light, in which case the frequencies of interest have a negative time delay.

The disclosed approach takes advantage of two or more closely separated absorption features in atomic vapors such as rubidium, cesium, and mercury to provide strong index of refraction gradients (dispersion between the features), which lead to a reduction in the propagation speed or group velocity of a light pulse passing through the vapor. The wavelength or frequency of the light pulse should fall in the region of high dispersion for this effect to occur. If this light pulse is scattered light from a gas, plasma, liquid or solid then it carries with it information associated with that medium. In particular, the light may constitute an image of, e.g., a specific feature of the sample at the specific wavelength, such as an image of a single rotational Raman line. All other light from the sample will either be absorbed by the atomic vapor or pass through the atomic vapor with little or no reduction in the propagation speed. If the light pulse duration is short in comparison to the time delay, a camera can be time gated to accept only the delayed light and reject all other light at wavelengths outside of the dispersive region.

Figure 1:
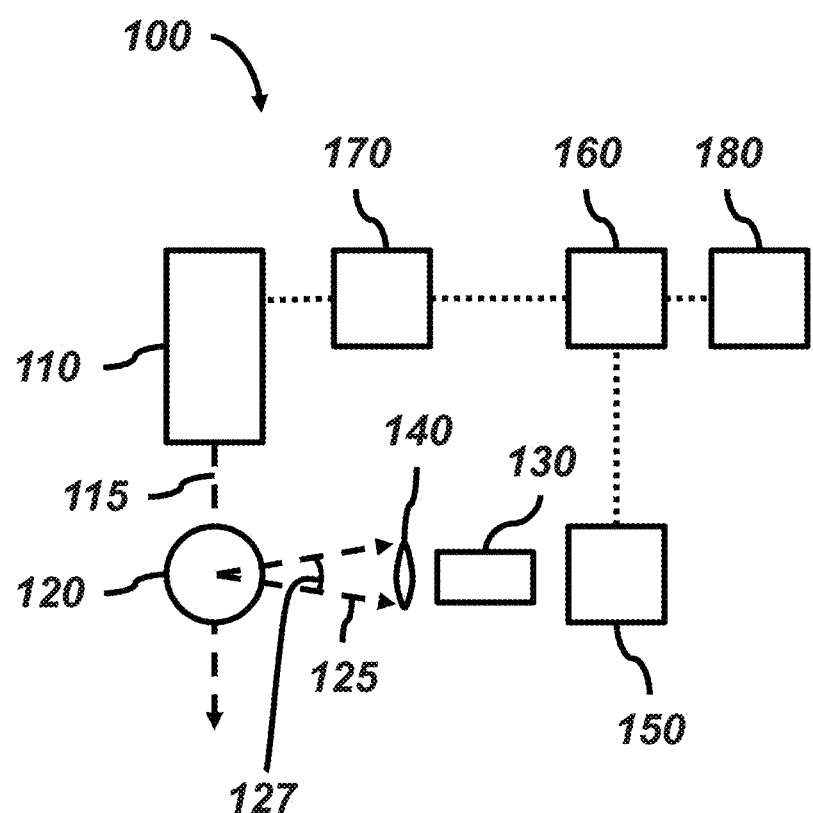
FIG. 1 is a diagrammatic illustration of one embodiment of the disclosed system.

One embodiment of a disclosed system is seen with reference to FIG. 1. The system for slow light imaging spectroscopy (100) includes a laser (110). The laser (110) should be capable of generating a beam of light (115) having a desired wavelength or frequency. The laser (110) is configured to pass the beam of light (115) through a sample (120). The light that is scattered by the sample (125) then passes through an atomic vapor cell (130), which may pass through a lens (140) to direct some of the scattered light (125) towards the atomic vapor cell (130). The atomic vapor cell contains at least one atomic vapor located within the atomic vapor cell, with at least one atomic vapor adapted to reduce group velocity. After the scattered light (125) passes through the atomic vapor cell (130) it is then received by a time-gated detector (150) which can be used to record the delayed images.

In certain embodiments, the laser (110) is tunable, and may be, e.g., a Ti:Sapphire laser, an Alexandrite laser, or a nanosecond Nd:YAG laser pumping a dye laser. In some embodiments, it may be a continuous wave (CW) laser or a pulsed laser. In certain embodiments, a pulse laser may be used, having a pulse length of less than or equal to 100 ns, and preferably less than or equal to 10 ns. In other embodiments, the laser (110) may utilize an optical parametric oscillator. For example, in one embodiment, the system utilized a CW tunable ring cavity Ti:Sapphire laser, while in another embodiment, the system utilized a 100 ps tunable Ti:Sapphire oscillator. In certain embodiments, the laser is a single tunable laser, while in others, it may utilize one or more single wavelength lasers. In certain embodiments the laser pulse can be further shortened in time by rapid electronic shuttering or pulse compression methods to improve the time delay discrimination.

For these systems, a wide range of repetition rates may be utilized, provided that the repetition rate must be less than the delay time. In some embodiments, the repetition rate may be between 1 Hz and 100 Mhz. To achieve this, in certain embodiments, a high repetition rate laser may be used, where the repetition rate is between 1 Mhz and 100 MHz. In other embodiments, the laser light beam may be chopped, amplified, or otherwise modified to create a pulsed beam having a desired repetition rate.

In some embodiments, that wavelength or frequency of the laser is chosen such that the scattering wavelength can be centered around known absorption resonances of a given element in the atomic vapor cell (130). For example, if the atomic vapor cell contains $^{85}$Rb, there is an absorbance resonance at around 780 nm (or 384.23 THz). Other examples include cesium at 852 nm and mercury at 254 nm.

The atomic vapor cell (130) must be constructed of a material that is at least partially transparent to the scattered wavelengths of light, and preferably a material that allows at least 85% transmission of light having wavelengths in the desired region. The size of the atomic vapor cell (130) can vary. The cell should be configured to have an aperture sufficiently large so as to achieve imaging of the light from the sample. In certain embodiments, the atomic vapor cell may be roughly cylindrical, having a body between 5 and 20 cm in length, preferably between 5 and 15 cm in length, and more preferably between 5 and 10 cm in length, and have an aperture or window on each end of the cylindrical body between 1 and 5 cm in diameter. The aperture or window is preferably sized to match the detector aperture. In some embodiments, the vapor cell is comprised of Pyrex or quartz. In some embodiments, the windows of the vapor cell are comprised of Pyrex, quartz, fused silica, or a borosilicate glass.

An atomic vapor is present in the atomic vapor cell (130). The atomic vapor should comprise either an isotope having a hyperfine split ground state, or two isotopes with closely separated ground states. The exact separation of the hyperfine lines is not critical, although typically two factors should be considered. First, the lines should have enough separation to provide acceptable transparency between them. Second, the lines should not be so separated that there is an unacceptably large reduction In the gradient or increase in the delay. Thus, in certain embodiments, the separation is between 1 and 15 GHz, and preferably between 2 and 10 GHz.

In certain embodiments, the atomic vapor comprises or consists of an isotope of, for example, rubidium, cesium, and/or mercury. In certain embodiments, the atomic vapor comprises or consists of two or more isotopes of, for example, rubidium, cesium, and/or mercury.

In certain embodiments, the atomic vapor cell (130) may be heated using known methods for heating vapor cells to control the vapor pressure within the cell. In some embodiments, the atomic vapor in the cell corresponds to a temperature of less than or equal to 100° C., preferably between 30 and 100° C., and more preferably between 40 and 80° C. Other temperatures ranges may be appropriate, depending on the atomic vapor in question.

A lens (140) may be used to direct the scattered light (125) through the atomic vapor cell (130) and on to the detector (150).

The time-gated detector (150) may be a time-gated camera or time gated intensifier.

In some embodiments, one or more processors (160) may be present in the system. The one or more processors (160) may be configured to communicate with various other devices or circuits in the system. For example, a processor may be configured to control the time-gated detector (150). Further, the processor may be configured to receive and decode signals from the time-gated detector. In certain embodiments, the processor is configured to receive an image from a time-gated camera and store the image in data storage location (180). The data storage location may be a local data storage (such as a hard drive), removable media (such as a USB drive or SD card), or remote storage (such as cloud storage, or hard drive on a remote server).

Figure 2A:
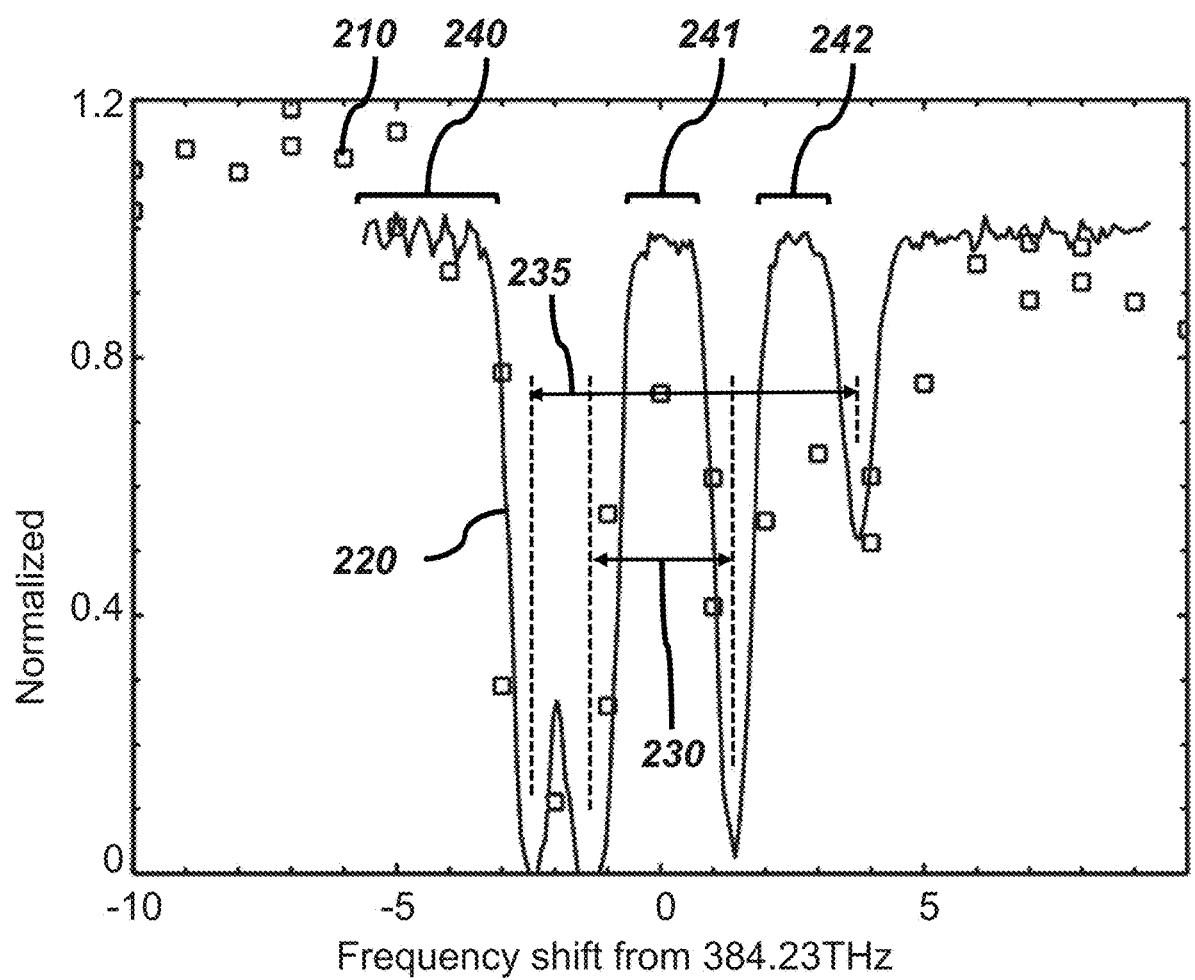
FIG. 2A is a graph showing exemplary transmission spectra of two embodiments of the disclosed system.

Referring to FIG. 2A, the spectra from two different systems are compared at low temperatures. The spectra from a first system (210, squares) utilized a 100 ps tunable Ti:Sapphire oscillator having an 80 MHz rep rate, for approximately a 3 GHz bandwidth. The spectra from a second system (220, solid line) was also captured, which utilized a tunable ring cavity Ti:Sapphire CW laser at 780 nm (384.230 THz). The atomic vapor cell contained approximately 72% $^{85}$Rb, 28% $^{87}$Rb. The mixture of rubidium 85 and rubidium 87 provides a series of absorption resonances in the vicinity of 780 nm (the D2 line or Rb). Referring to FIG. 2A, the hyperfine splitting of 3 GHz (230) and 6.8 GHz (235) for the $^{85}$Rb and $^{87}$Rb isotopes, respectively, can easily be identified. Further, multiple positive dispersion regions (240, 241, 242) can be readily identified.

Figure 2B:
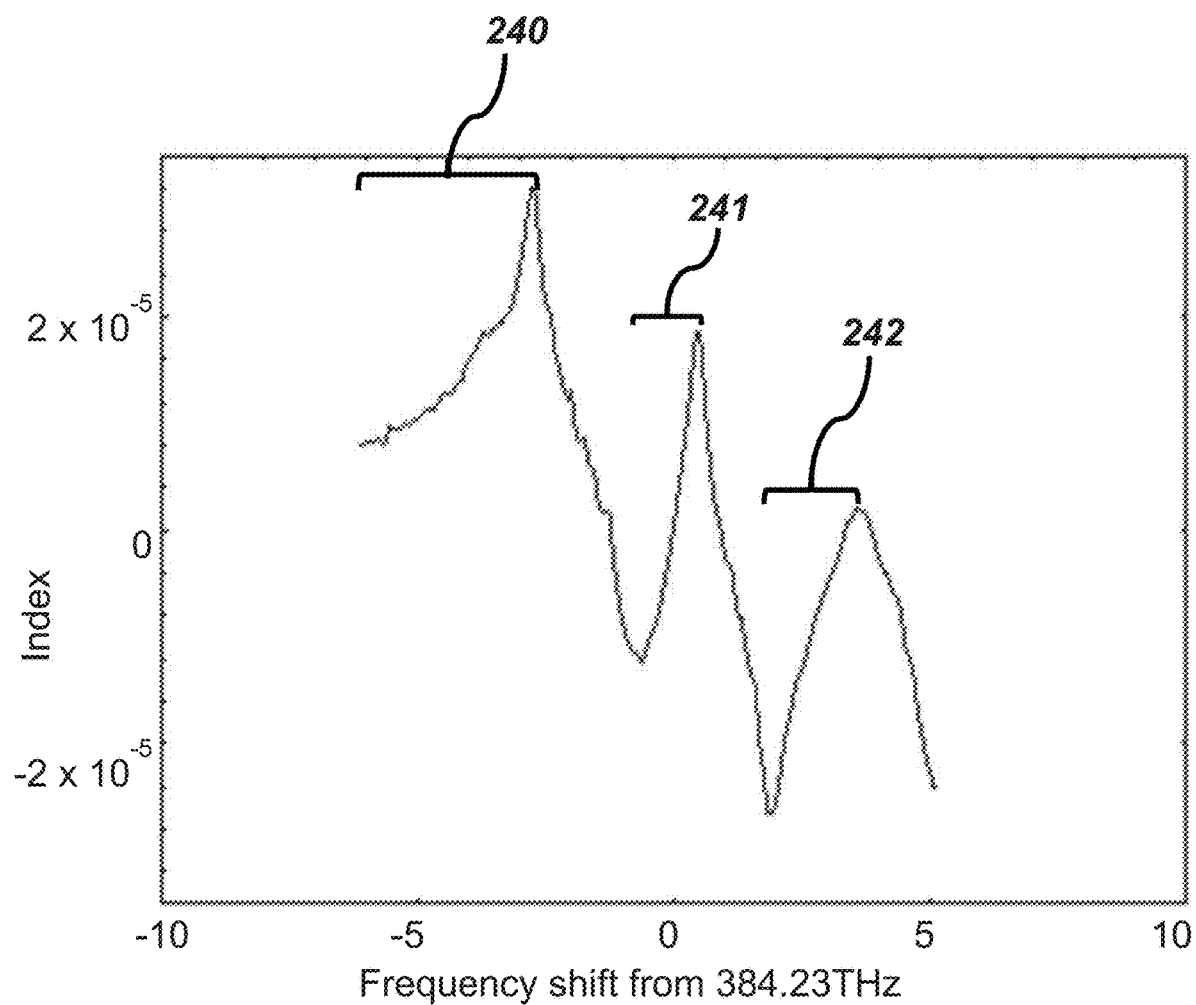
FIG. 2B is a graph showing the index change predicted in one embodiment of the disclosed system.

When the frequency of the light reaching the Rb vapor filter or atomic vapor cell placed in front of a time gated camera corresponds to a positive dispersion region highlighted in FIG. 2B, taken at normal operating temperatures, the light pulses experience a delay and the images may be recorded by the appropriately delayed fast camera or intensifier. All the other wavelengths (including the pump laser in a Raman/Rayleigh scattering configuration) are not delayed and hence would not be recorded by the delayed fast camera or intensifier.

Figure 3:
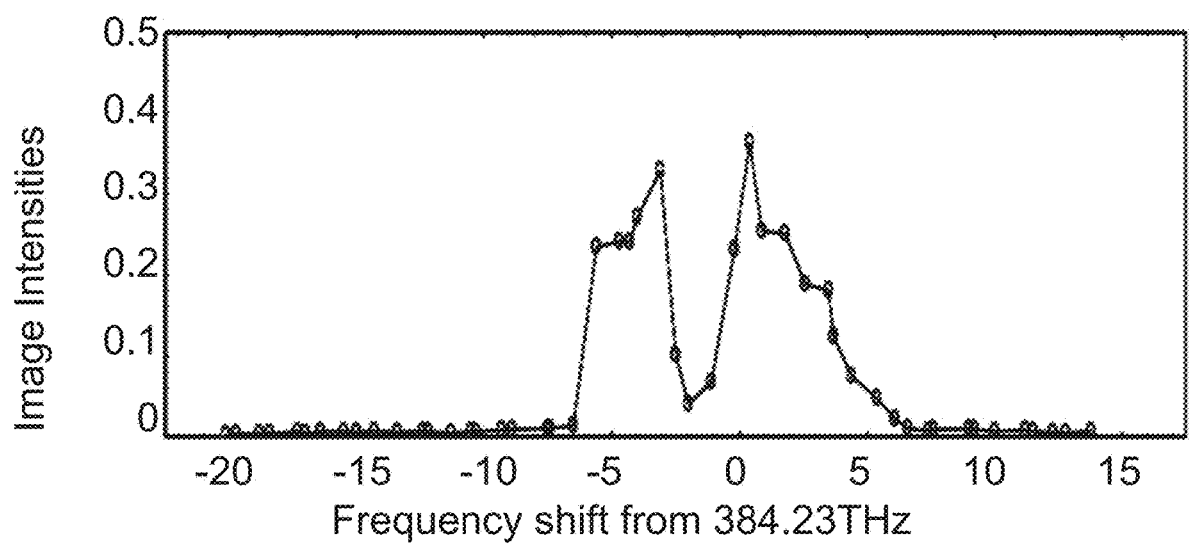
FIG. 3 is a graph showing 2 ns delayed image intensities of an embodiment of the disclosed system.

FIG. 3 shows the intensities of the images recorded using a 2 ns delayed gated camera.

Using a sufficiently fast detection system, e.g., with less than or equal to approximately 50 ps resolution, and preferably with less than or equal to 20 ps resolution, the group delay can be measured as the laser frequency is changed. In some embodiments, the group delay is measured at multiple frequencies.

As is known in the art, group delay ($T_g$) is a useful measure of time distortion, and is calculated by differentiating, with respect to frequency, the phase response, using, e.g., the formula:

$$T_g = \frac{\partial \varphi}{\partial \omega},$$

where φ is the spectral phase response, and ω is the angular frequency.

Figure 4A:
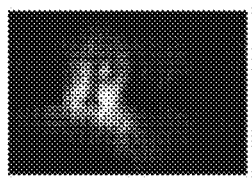
FIGS. 4A-4H are images showing non-delayed captured images of scattering from a card with the letter P illuminated by a 0.1 nsec laser for an embodiment of the disclosed system.
Figure 4B:
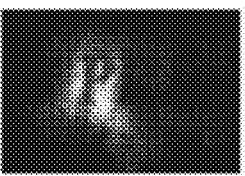
Figure 4C:
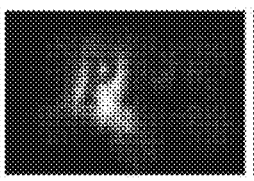
Figure 4D:
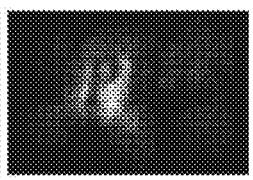
Figure 4E:
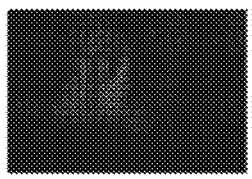
Figure 4F:
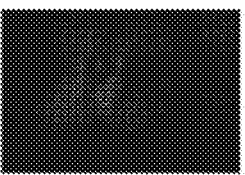
Figure 4G:
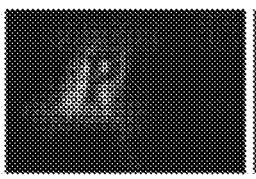
Figure 4H:
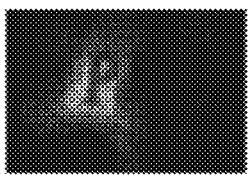
Figure 4I:
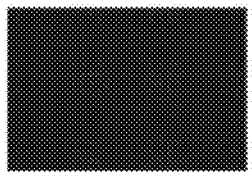
FIGS. 4I-4L are images showing 2 ns delayed captured images of scattering from a card with the letter P illuminated by a 0.1 nsec laser for an embodiment of the disclosed system.
Figure 4J:
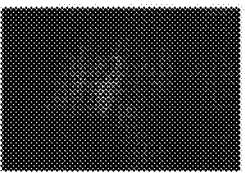
Figure 4K:
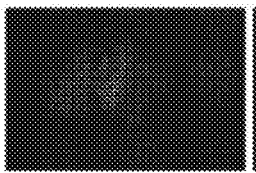
Figure 4L:
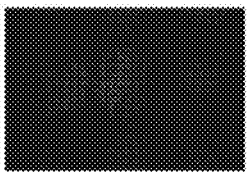

A demonstration of this capability is achieved by imaging direct scattering of laser light from a surface. In this case the scattered light is at the same frequency as the laser. The images of laser scattering from a card with the letter P illuminated by a 0.1 nsec, frequency tunable laser pulse shown in FIG. 4A-4H were recorded with no delay at frequency shifts of around −20 GHz (FIG. 4A), around −15 GHz (FIG. 4B), around −10 GHz (FIG. 4C), around −5 GHz (FIG. 4D), around 0 GHz (FIG. 4E), around 5 GHz (FIG. 4F), around 10 GHz (FIG. 4G), and around 15 GHz (FIG. 4H), where 0 GHz is arbitrarily chosen to be centered between hyperfine absorption features. Discernable images were recorded at all measured points in time, even at frequencies outside the Rb lines. The images shown in FIGS. 4I-4L were recorded with a delay of 2 ns from the non-delayed images. At frequencies outside the dispersive regions the delayed camera sees no light (hence dark images, shown in FIG. 4I, were captured at around −20, around −15, around −10, around 10, and around 15 Ghz shifts), while in the regions corresponding to a positive group delay (at frequency shifts of around −5 GHz (FIG. 4J), around 0 GHz (FIG. 4K), and around 5 GHz (FIG. 4L)), the delayed camera records a scattered image. It is evident that the delayed images were only obtained in the region where positive group delays were identified, and that the measured group delay matches the delay imposed on the time-gated camera in order to be able to spectrally resolve the desired laser frequencies.

Figure 4M:
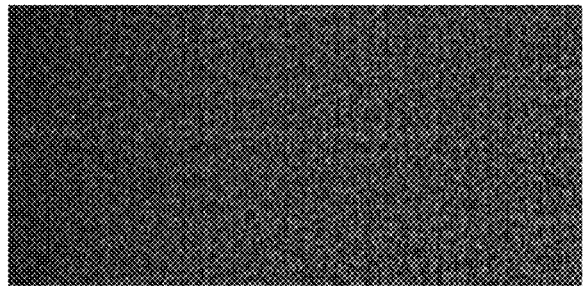
FIGS. 4M-4N are images showing 10 ns delayed captured images of Rayleigh scattering from air for an embodiment of the disclosed system.
Figure 4N:
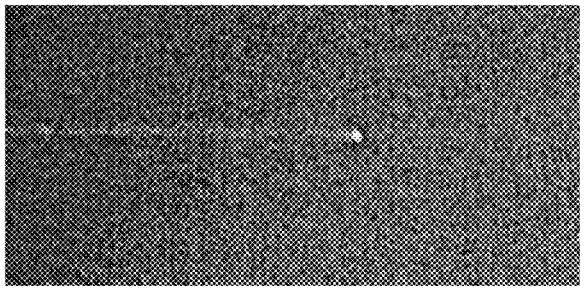

FIGS. 4M-4N provide an example of implementation of the disclosed approach is the use of pulsed laser illumination for the imaging of the Rayleigh scattering from a gas (air, in this case) and the simultaneous rejection of all other frequencies not associated with Rayleigh scattering. Since Rayleigh scattering is at the same wavelength as the illuminating laser, tuning the laser moves the Rayleigh scattering in or out of the high dispersion, filter delayed transmission spectral window. A Ti:Sapphire laser was tuned such that its wavelength falls in the region of high dispersion (here, 780 nm given an atomic vapor cell contain Rb), and the atomic vapor cell was placed in front of a time gated camera. The sample medium was illuminated such that the scattered light constitutes an image which can be captured by the camera. In this manner an image of the spatial distribution of the gas illuminated by the laser can be captured by the time delayed camera. In this example, a short pulse was obtained by chopping down to 15 ns the output pulse from the tunable nanosecond Ti:Sapphire laser system. This was done by using a series of Pockels cells driven by nanosecond electrical pulses. When the laser is tuned to the region of high dispersion, the filter delays the Rayleigh scattering image such that camera gating synchronous with the laser pulse exhibits no image (FIG. 4M), while the 10 ns delayed gating, with 5 ns image gating, allows for imaging of the Rayleigh scattering (FIG. 4N). The line, representing the imaged scattering, is clearly present in FIG. 4N, while being absent in FIG. 4M. This filtering provides a highly selective and highly efficient method of imaging Rayleigh scattering off the gas investigated while simultaneously eliminating other scattering such as Raman or laser induced fluorescence. A similar approach can be applied to capture specific Raman scattering features and eliminate Rayleigh scattering.

An implementation of the disclosed approach is the use of pulsed laser illumination for the imaging of a specific Raman line from a plasma, gas, solid or liquid sample and the simultaneous rejection of other Raman lines from the same or other species as well as background and Rayleigh scattering associated with the laser illumination. The laser is tuned such that the wavelength of the desired Raman line falls in the region of high dispersion, and the atomic vapor cell is placed in front of a time gated camera. The sample medium can be illuminated such that the scattered light constitutes an image which can be captured by the camera. In this manner an image of the spatial distribution of a specific energy state of the selected medium can be captured by the time delayed camera. This provides a highly selective and highly efficient method of imaging spectral features associated with laser scattering mechanisms including Raman, Thomson and Rayleigh scattering. By frequency tuning the illumination laser, any desired spectral feature can be selected.

The steps of the disclosed approach include providing an atomic vapor cell with an aperture large enough to achieve imaging of the light passing through, the selection of an atomic vapor with the proper characteristics to provide sufficient reduction in the propagation speed to separate the light of interest from out of band background light, the selection of a frequency tunable laser that has the wavelength, tuning range, pulse duration and pulse energy appropriate to the spectroscopy that is to be undertaken and the selection of a time gated detector or camera to image the light of interest.

Figure 5:
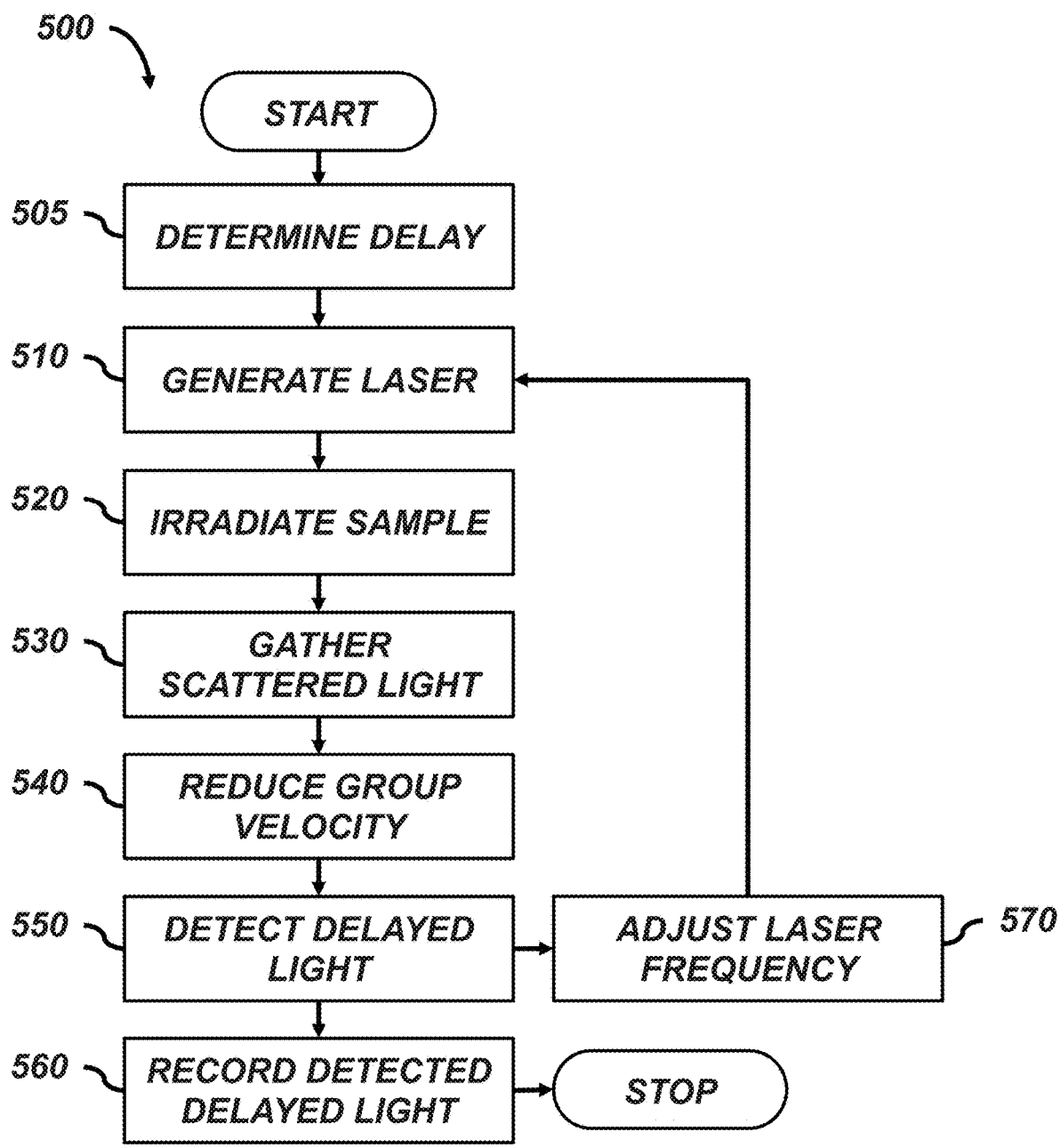
FIG. 5 is a flowchart of one embodiment of a disclosed method.

One embodiment of a method for slow light imaging spectroscopy can be described with respect to FIG. 5. The method (500) may optionally require determining the group delay at various frequencies (505). If the group delay is known or can be estimated, the method generally begins by generating a beam of light with a laser having a desired wavelength or frequency (510). This beam of light is then used to irradiate a plasma, gas, solid or liquid sample (520), by passing the beam of light through at least a portion of the sample. The sample scatters at least some of the light, and some of the scattered light may be gathered or collected (530) and passed through an atomic vapor cell. The atomic vapor cell contains at least one isotope that reduces group velocity/propagation speed sufficiently to separate the light of interest from out of band background light. The delayed light passing through the atomic vapor cell is then detected (550), and any detected image or signal may be recorded (560). In some embodiments, the laser frequency or wavelength is then adjusted (570), and the process is repeated until a desired range of frequencies (such as +/−20 GHz from a target frequency, +/−15 GHz, +/−10 GHz, etc.) is utilized. In some embodiments where multiple frequencies are tested, the difference between any two frequencies is fixed, while in other embodiments, the differences may vary. For example, looking at FIG. 2A, three positive dispersion regions (240, 241, 242) can be seen at approximately a −5 GHz shift, 0 GHz shift, and +3 GHz shift. This may more explicitly be seen in reference to FIG. 2B, where the index change of the same embodiment used in FIG. 2A, the three positive dispersion regions (240, 241, 242) can more readily be seen. An embodiment could utilize one or more frequencies around a −5 GHz shift, then jump to one or more frequencies around a 0 GHz shift, then jump to one or more frequencies around a +3 GHz shift. This embodiment may utilize a rapidly pulsed laser such that multiple images can be acquired in rapid succession, capturing the rapidly changing properties of the sample region such as may occur in combusting environments and nonequilibrium gas flows. A further embodiment may include a rapidly pulsed laser that is swept in frequency such that multiple spectral features can be rapidly acquired.

Inter alia, the disclosed approach enables one- or two-dimensional imaging of a selected molecular species and imaging of a selected energy state of that species. It provides significant enhanced capabilities for combustion and plasma diagnostics and provides valuable information on nonequilibrium and transient phenomena. Another advantage is that the time-delayed filter is a passive device, it relies on the dispersion provided by the natural state of the atomic species in the filter cell without the need of optical pumping. This allows the approach to be seamlessly incorporated into commercial devices.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed:

1. A system for slow light imaging spectroscopy comprising:
    a laser capable of generating a beam of light for a first period of time, the beam of light having a desired wavelength and illuminating a plasma, gas, solid or liquid sample with the laser;
    an atomic vapor cell in the path of the light emerging from the sample, the atomic vapor cell having an aperture sufficient to achieve imaging of the light from the sample;
    at least one atomic vapor located within the atomic vapor cell, with at least one atomic vapor selected to reduce group velocity, wherein the at least one atomic vapor comprises at least one isotope having a hyperfine split ground state or two isotopes with closely separated spectral features; and
    a time-gated detector to record at least one delayed image, wherein the desired wavelength falls within a region of high dispersion for the at least one atomic vapor in the atomic vapor cell, causing a delay in the propagation of the desired wavelength of light through the cell for a second period of time equal to or greater than the first period of time, and
    wherein the timed-gate detector is configured to delay detection for a period of time sufficient for the delayed wavelength of light to be separately distinguished from other wavelengths of light passing through the atomic vapor cell.

2. The system according to claim 1, wherein the laser includes a Ti:Sapphire laser, an Alexandrite laser, a nanosecond Nd:YAG laser pumping a dye laser, an optical parametric oscillator, or a combination thereof.

3. The system according to claim 1 wherein the laser constitutes a high repetition rate, pulse burst laser.

4. The system according to claim 3 wherein the high repetition rate laser is swept in frequency, permitting multiple images of different spectral features to be collected in rapid succession.

5. The system according to claim 1, wherein the at least one atomic vapor includes one or more isotopes of elements selected from the group consisting of rubidium, cesium, and mercury.

6. The system according to claim 1, wherein the at least one atomic vapor is maintained at a vapor pressure corresponding to a temperature between 30° C. and 100° C.

7. The system according to claim 1, wherein the time gated detector is a time gated camera or image intensifier.

8. The system according to claim 1, further comprising a processor configured to store the at least one delayed image in a data storage location.

9. The system according to claim 1, wherein the timed-gate detector is configured to delay detection for at least 2 ns after the beam of light begins illuminating the sample.

10. A method for slow light imaging spectroscopy comprising:
    generating a beam of light for a first period of time with a laser having a desired wavelength;
    passing the beam of light through a plasma, gas, solid or liquid sample, where at least a portion of the beam of light is scattered by the sample;
    reducing group velocity by passing at least some of the scattered light through an atomic vapor cell;
    receiving the beam of light after passing through at least one atomic vapor comprising at least one isotope having a hyperfine split ground state or two isotopes with closely separated spectral features; and
    detecting a delayed image with a time-gated detector, wherein the desired wavelength falls within a region of high dispersion for the at least one atomic vapor in the atomic vapor cell, causing a delay in the propagation of the desired wavelength of light through the cell for a second period of time equal to or greater than the first period of time, and wherein the timed-gate detector is configured to delay detection for a period of time sufficient for the delayed wavelength of light to be separately distinguished from other wavelengths of light passing through the atomic vapor cell.

11. The method according to claim 10, wherein the delayed image is detected with a time-gated detector.

12. The method according to claim 11, wherein the time gated detector is a time gated camera or image intensifier.

13. The method according to claim 10, wherein the at least one atomic vapor includes one or more isotopes of elements selected from the group consisting of rubidium, cesium, and mercury.

14. The method according to claim 10, further comprising heating the atomic vapor.

15. The method according to claim 10, further comprising recording time-delayed images at a remote data storage location.

16. The method according to claim 10, further comprising varying the frequency of the beam of light and determining group delay at a plurality of frequencies.

* * * * *